Aug. 20, 1935. P. H. CHASE 2,011,561
CABLE
Filed July 25, 1928 2 Sheets—Sheet 1
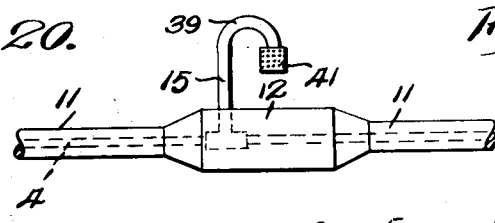
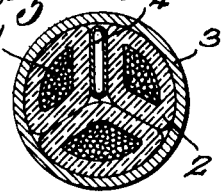
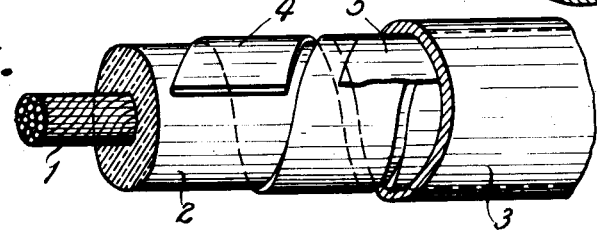
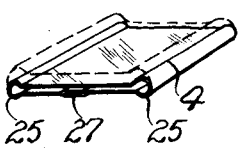
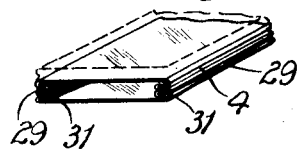
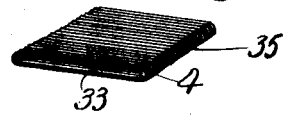
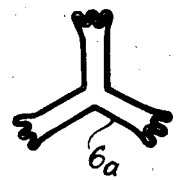
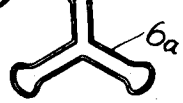

Aug. 20, 1935. P. H. CHASE 2,011,561
CABLE
Filed July 25, 1928  2 Sheets-Sheet 2
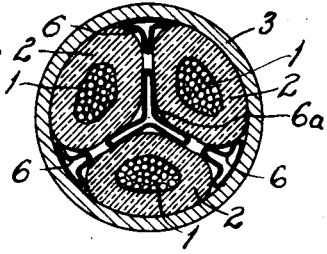
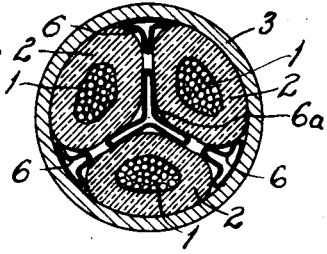
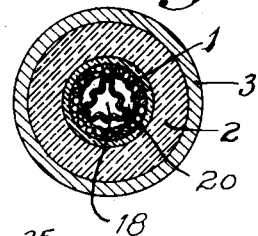
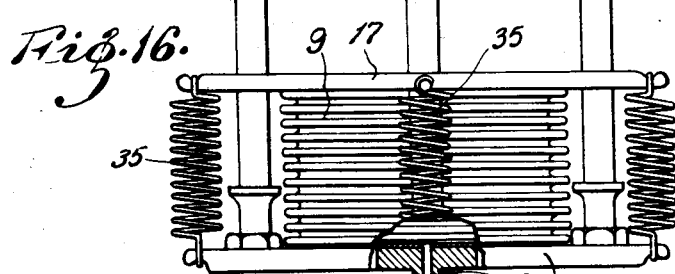
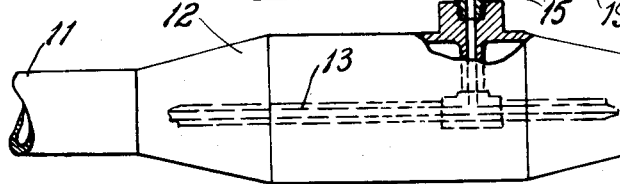
Philip H. Chase, Inventor
Carlos F. Haynes, Attorney Patented Aug. 20, 1935

2,011,561

UNITED STATES PATENT OFFICE 2,011,561

CABLE

Philip H. Chase, Bala-Cynwyd, Pa.

Application July 25, 1928, Serial No. 295,222

16 Claims. (Cl. 173—266)

This invention relates to cables, and with regard to certain more specific features to impregnated electric cable preferably for high voltages.

Among the several objects of the invention may be noted the provision of a simple and improved method of constructing a cable to relieve or equalize hydrostatic pressures within the sheath; the provision of an improved gas filled expansion device within the cable for controlling the internal pressure due to temperature changes; the provision of a cable construction of the class described which minimizes the formation of voids therein; and the provision within a cable of the class described of a device for compensating the pressures caused by the relative expansion and contraction of the parts of the cable. Other objects will be in part obvious and in part pointed out hereinafter.

The invention accordingly comprises the elements and combinations of elements, features of construction and operation, arrangement of parts, steps and sequence of steps which are exemplified in the structure hereinafter described and the scope or application of which will be indicated in the following claims.

In the accompanying drawings in which are illustrated several embodiments of the invention, Fig. 1 is a trimetric view of a section of cable, certain portions being broken away to show a helical form of the invention;

Figs. 2, 3, and 4 are trimetric views showing sections of various forms of flexible containers;

Figs. 5 and 6 are trimetric views showing sections of flexible containers having laterally corrugated surfaces;

Fig. 7 is a trimetric view of a section of cable, showing a modified non-helical form of the invention, parts being broken away;

Fig. 8 schematically illustrates a system in which disconnected elements of the present invention are used without reservoirs;

Fig. 9 is a view similar to Fig. 8 showing certain closed reservoir connections, thereby providing a modified form of the invention;

Fig. 10 is a view similar to Fig. 8 showing certain elements in connected form and without reservoirs;

Fig. 11 is a view similar to Fig. 8 showing certain separate elements of the invention in communication with separate reservoirs;

Fig. 12 is a trimetric view, partly in section showing a modified triangular form of the invention;

Fig. 13 is a cross section of a cable showing the application of the parts shown in Fig. 12;

Fig. 14 is a cross section of a cable showing another form of the invention;

Fig. 15 is a trimetric view partly in section showing one of the members used in the Fig. 14 construction;

Fig. 16 is a side elevation of a preferred form of reservoir, certain portions being broken away;

Figs. 17, 18, and 19 are cross sections showing modified form of the Fig. 12 triangular shapes;

Fig. 20 is a fragmentary detail of a venting means; and,

Fig. 21 is a cross section showing an alternative tape position.

Similar reference characters indicate corresponding parts throughout the several views of the drawings.

Referring now more particularly to Fig. 1, the ordinary cable conductor is designated by numeral 1 and the insulation by numeral 2. Applied helically over the insulation is a hollow tape or container or conduit 4, peripherally closed, which is so constructed of thin, flexible metal, for example copper which is impermeable, that the cross-sectional area, and therefore the volume, is capable of sufficient change, as a consequence of lateral movement of the walls. Over this hollow tape 4 is applied a retaining or protecting tape 5, which may be made of paper or metal or of other suitable material. This protecting tape 5 is laid on helically in the same or reverse helical direction with regard to the hollow tape 4. The usual outer lead sheath 3 is then applied.

Figs. 2, 3, and 4 show sectionally and in trimetric projection several modifications of the hollow tape or flattened tube 4, in which said tape 4 is constructed of one or two strips of thin metal tightly joined together at the edges for example by welding or soldering, or by a combination of these methods, to afford a fluid-tight union. The solid lines show the unexpanded or compressed positions of the walls and the dotted lines show the positions of the walls when laterally expanded due to a difference in internal and external pressures.

Fig. 2 shows the hollow tape with rounded edges 21 and with a welded or soldered joint 23. Fig. 3 shows the tape with bulbous edges 25 with a welded or soldered joint 27. Fig. 4 shows a bellows type of tape having edges 29 formed with reentrant curvatures adapted to form folds and creases 31, thereby providing increased flexibility. The hollow tapes also may be formed from seamless tubing, by flattening and/or drawing to the desired shape and size.

In order to permit the hollow tape to warp more readily when it is applied to the cable during manufacture, to provide greater flexibility during bending of the cable and to minimize initial strains, particularly in those portions of the walls of the tape which are subject to flexure during operation, one or more of the walls of the hollow tape may be slightly corrugated laterally of the length, for example as shown at numeral 33 in Figs. 5 and 6.

Fig. 5 shows a form in which the lateral corrugations are formed only on the flat faces of the tape, whereas in Fig. 6 is shown a form in which the corrugations on the faces are carried around the edges of the tape, as illustrated at numeral 35, so that said corrugations are substantially continuous around the tape.

In Fig. 7 is shown a cable with the hollow tape 4 laid axially of the cable and without retaining or protecting tape thereover.

The hollow tape 4 in this embodiment, as well as those shown in Figs. 1, 2, 3, 4, 5, and 6, comprise a continuous, separate, expansible passageway or conduit lengthways of the cable, which contains and/or transmits fluids of gaseous form, which fluids may, if desired, be of nature which would ordinarily adversely affect the insulation of the cable if in contact therewith or interspersed therein. It is apparent that by the use of a gas such as air, for example, for filling the hollow tape, the internal hydrostatic pressure along the cable is substantially equalized and made susceptible of control. Further, it is apparent that this control of hydrostatic pressure is quickly responsive to changed conditions and is largely independent of the degree of viscosity or fluidity of the cable impregnating compound.

The hollow tape may be used in cable which has compound-filled passages in or adjacent the insulation or conductor.

Variations of hydrostatic pressure within a cable are largely determined by the relative temperatures and coefficients of expansion of the conductor, insulation, compound and outer sheath. As the conductor, solid insulation and impregnating compound or oil (liquid) are substantially incompressible, the resultant pressure from their expansion ordinarily is exerted on the outer sheath. In case this is of lead, permanent stretching of the sheath may be caused. Conversely, when the cable cools the internal hydrostatic pressure will be lower than under corresponding conditions before the sheath had stretched. Low pressures may result in the rapid deterioration and ultimate failure of the insulation, due to the formation of voids and ionization therein under electric stress. The utilization of my hollow gas-filled tape affords a means and method of controlling or regulating the hydrostatic pressure within predetermined limits and thereby contributes to minimize the stretching of the outer sheath, the formation of voids and the destruction of insulation.

A system of hollow tapes, without connections or reservoirs is illustrated schematically in Fig. 8. The cable sections 11 are connected by splices 12, but the hollow tapes 4 are not connected with or in said splices.

The hollow tape may be continuous throughout one or more sections of cable (Figs. 9 and 10). Connections between the hollow tapes in adjacent cable lengths are made preferably in the cable splices by small connecting pipes or tubes 13, or the hollow tapes may merely open into the splices in case the impregnating compound and the gaseous fluid in the hollow tape may be permitted to mix or be in contact.

As the temperature of the different parts of the cable changes and there is a difference in the rate of expansion of those parts, the pressure upon the walls of the hollow tape changes and if there is an excess external pressure, such as, for example when the cable is heating, the hollow tape 4 decreases in cross section and thus limits the pressure exerted upon the outer sheath.

Conversely, in case there is a decrease of pressure external to the hollow tape, such as, for example, when the cable is cooling, the hollow tape increases in cross section and compensates for the shrinkage of the compound and other parts and thus prevents the pressure from decreasing to values which would cause the formation of voids. The above is true both when the various sections of tape are connected and when they are installed separately.

It will be seen from the above that inasmuch as the gaseous fluid is inherently compressible, that expansion and contraction may take place without substantial longitudinal flow of gas through the tape. The result is a quicker response to temperature changes and the like, because friction due to flowing fluid in the tape is substantially eliminated.

However, if it is desirable under certain conditions to permit a longitudinal flow, this may be done by providing closed reservoirs connected to the hollow tape or preferably to the connections between the hollow tapes at the cable splices as illustrated in Fig. 9. In this case reservoirs 37 are connected to the pipes 13 by pipes 15, or the reservoirs may be directly connected to the separate and disconnected tape sections illustrated in Fig. 11, thus also affording means for obtaining different pressure throughout different cable sections. In this case each tape section has a separate reservoir. It is clear that when gas reservoirs of this class are used, that for a given change of cable volume, due to temperature or other changes, the ratio of compression is lower and that therefore a more uniform predetermined internal tape pressure may be obtained under varying conditions. The cross-sectional area of the tape and the distance of gas travel from the reservoirs can be varied to suit the requirements. When the reservoirs are eliminated the ratio of gaseous compression under given cable volume changes is higher but on the other hand most flow along the tape is eliminated.

In case pressure control at atmospheric pressure is desired the reservoirs may be omitted and the pipes 15 left open to the air, said openings preferably being suitably located and guarded to prevent the entrance of foreign substances. This is shown in Fig. 20 wherein numeral 39 designates an inverted U-section to properly locate the opening, and 41 is a guard.

The reservoirs may be of various type other than illustrated, such as for example collapsible metallic bellows, with or without weights or spring devices, and the like, depending upon the pressure limits and operating characteristics desired.

In Fig. 16 is shown a spring-loaded bellows type of closed reservoir connected to a pipe 13, the latter joining adjacent tape lengths. In this construction the bellows 9 is interiorly connected with said pipe 13 and held under compression by springs 35 operating on end plates 17, 19 for the bellows.

As stated, the hollow tapes in each section length may terminate in and open into the splice or splices at either end and there may be a reservoir connecting to the interior of the splice which serves both for the compound or liquid in the interstices of the splice and cable and for the gaseous fluid in the hollow tape. Also the reservoir for the hollow tape may be installed internal to the splice, with or without a reservoir for supplying the splice.

Although the use of reservoirs has been set out above, it should be understood that pressure control, without the use of reservoirs is afforded by the inverse relation between pressure and volume. The hollow tape of the desired area cross-section, after being filled with the desired gas at the desired pressure, is closed so that the space occupied by the hollow tape is determined by the pressure and temperature of the cable parts adjacent thereto.

The gas filled hollow tape in each section of cable may be divided into a number of relatively short separate closed passages in order to localize more closely the extent of damage or loss of fluid in the event of a leak or rupture of the walls of the hollow tape. This is possible because substantially no flow is required along the tape under many operating conditions.

It is apparent that two or more hollow tapes may be used in case a greater range of volumetric capacity is desired.

The hollow tape may be laid in between the insulated conductors of a multiple-conductor cable, particularly of the shielded type. This is illustrated in Fig. 21 in which numeral 4 indicates hollow tape or flat tubing of the shape shown in Fig. 2.

The hollow container can also be made in a generally triangular shape instead of in flat tape form. Fig. 12 illustrates shapes 6 and 6a adapted in shape to lie respectively in the spaces ordinarily occupied by lateral and central fillers in a 3-conductor, sector type cable such as shown in Fig. 13. Either of these shapes may have a portion lie between the point of nearest approach of the insulated conductors, or either or both shapes of tube may be confined to the filler space. In Fig. 13 the shapes 6 and 6a are shown in position in a cable and these shapes may be used either singly or together, or shape 6 may be used with the flat tube or tubes of Fig. 21.

As illustrated in Figs. 17, 18, and 19 the edges 31 of the Fig. 12 members may be formed as are the edges of the tape shown in Figs. 2, 3, and 4, that is, made bulbous or convoluted to various degrees.

Fig. 14 illustrates an expansible, triangular-shaped convoluted conduit 18 carried through the center 20 of the conductor 1, in a cable of the hollow conductor type. Fig. 15 shows the conduit 18 in enlarged view. The conduit is preferably formed with a twist or lay several times its diameter in order to afford greater flexibility during bending of the cable. In this form the gas is carried inside of the conduit 18. In case separate reservoirs are used, the pipe connections in the splices from the conduit to the reservoirs are made in part of insulating materials or through insulating joints.

It is to be understood that certain classes of gas within the tape may under certain conditions be more desirable than others, taking for example an inert gas such as nitrogen and depending upon particular circumstances.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The cable comprising a conductor, a sheath around the conductor, a liquid insulating medium in the sheath expansible with increase in temperature, a hollow, impermeable conduit within the sheath formed in separate sections and containing gas, and separate reservoirs communicating with said separate sections respectively, the conduit being unattached to surrounding bodies and being substantially expansible and contractible in area of cross section in response to change in pressure exerted upon said conduit by said liquid insulating medium due to change in hydrostatic pressure.

2. In a cable, a plurality of cable sections, each section comprising an insulated conductor, a sheath surrounding the insulated conductor, said sections being spliced together at intervals, a liquid insulating medium in the sheath expansible with increase in temperature, hollow, expansible, impermeable conduits having separate sections in the respective sheath sections between splices, each conduit section having a communication with a point external to the sheath at the respective splice, the conduits being unattached to surrounding bodies and being substantially expansible and contractible in area of cross section in response to change in pressure exerted upon said conduits by said liquid insulating medium due to change in hydrostatic pressure.

3. In a cable, a plurality of cable sections, each section comprising an insulated conductor, a sheath surrounding the insulated conductor, said sections being spliced together at intervals, hollow, expansible, impermeable conduits having separate sections in the respective sheath sections between splices, each conduit section having a communication with the atmosphere at the respective splice.

4. A cable comprising a conductor, a sheath around the conductor, a hollow, expansible, impermeable conduit within the sheath formed in separate sections, said sections communicating with the atmosphere.

5. A cable comprising a conductor, a sheath around the conductor, a liquid insulating medium in the sheath expansible with increase in temperature, a hollow, expansible, impermeable conduit within the sheath formed in separate sections and containing gas, external gas reservoirs, and means effecting communication between said hollow conduit and said reservoirs, the conduit being unattached to surrounding bodies and being substantially expansible and contractible in area of cross section in response to change in pressure exerted upon the conduit by the liquid medium due to change in hydrostatic pressure.

6. A cable comprising a plurality of insulated conductors, a liquid insulating medium in the cable expansible with increase in temperature, a sheath surrounding the conductors and insulation, and an impermeable, expansible conduit within the sheath and between the nearest points of adjacent conductors, the conduit being unattached to surrounding bodies and being substantially expansible and contractible in area of cross section in response to change in pressure exerted upon the conduit by the liquid medium due to change in hydrostatic pressure.

7. A cable comprising a plurality of insulated conductors, a sheath surrounding the insulated conductors, and an impermeable, expansible, conduit within the sheath and between the insulated conductors, said conduit having a relatively flat cross section.

8. A cable comprising a sheath, a plurality of conductors in said sheath having liquid insulation therearound, said insulated conductors and sheath being arranged to provide filler spaces between the insulated conductors, and at least one hollow, expansible, impermeable conduit within the sheath and located within a portion of the filler space, the same incompletely occupying said filler space, the conduit being unattached to surrounding bodies and being substantially expansible and contractible in area of cross section in response to change in pressure exerted upon the conduit by said liquid insulation due to change in hydrostatic pressure.

9. A cable comprising a sheath, a plurality of conductors in said sheath having insulation therearound, said insulated conductors and sheath being arranged to provide radially located spaces and a separate hollow, expansible, gas-tight conduit between the insulated conductors and having a multiple-armed cross section comprising joining flat sections fitting within said radially located spaces.

10. A cable comprising a sheath, a plurality of conductors in said sheath having insulation therearound, said insulated conductors and sheath being arranged to provide radially located filler spaces and a hollow, impermeable, expansible conduit between the insulated conductors and having a multiple-armed cross section comprising joining flat sections fitting within said filler space, said filler space also having T-shaped portions adjacent the sheath and T-shaped flexible conduit sections adapted to fit within said T-shaped filler spaces.

11. A cable comprising a series of conductors, a series of sheaths respectively positioned around the conductors, a series of hollow, impermeable, expansible and contractible conduits within the respective sheaths, splices connecting the sheaths, and splices connecting the conductors, said conduits being open to space in the splices, the expansion and contraction of area of cross section of the conduits taking place inversely to that of the surrounding parts of the cable.

12. A cable comprising a series of conductors, a series of sheaths respectively positioned around the conductors, a series of hollow, impermeable, expansible and contractible conduits within the respective sheaths, splices connecting the sheaths, and splices connecting the conductors, and separate reservoirs, said conduits being open to said reservoirs, the expansion and contraction of area of cross section of the conduits taking place inversely to that of the surrounding parts of the cable.

13. A cable comprising a conductor, a sheath around the conductor, a hollow, expansible conduit within the sheath, and an inert gas in said conduit.

14. A cable comprising a conductor, a sheath around the conductor, a hollow, expansible conduit within the sheath, and an inert gas in said conduit, said inert gas comprising nitrogen.

15. A cable comprising a plurality of conductors, insulation about said conductors, a sheath surrounding the conductors and insulation, and an impermeable, expansible conduit within the sheath, said conduit having a relatively flat cross section and being transversely corrugated.

16. A cable comprising a conductor, a sheath around the conductor, at least one hollow, expansible chamber within the sheath, and an inert gas in said chamber, said gas comprising nitrogen.

PHILIP H. CHASE.